US012775708B2

(12) United States Patent
Mishra et al.

(10) Patent No.: US 12,775,708 B2
(45) Date of Patent: Oct. 27, 2026

(54) SECURITY SCAN WITH BACKUP

(71) Applicant: Rakuten Symphony, Inc., Tokyo (JP)

(72) Inventors: Ashok Kumar Mishra, San Jose, CA (US); Ramendra Pratap Singh, Bangalore (IN)

(73) Assignee: Rakuten Symphony, Inc., Tokyo (JP)

( * ) Notice: Subject to any disclaimer, the term of this patent is extended or adjusted under 35 U.S.C. 154(b) by 0 days.

(21) Appl. No.: 18/247,241

(22) PCT Filed: Dec. 15, 2022

(86) PCT No.: PCT/US2022/052988
§ 371 (c)(1),
(2) Date: Mar. 29, 2023

(87) PCT Pub. No.: WO2024/129083
PCT Pub. Date: Jun. 20, 2024

(65) Prior Publication Data
US 2025/0298897 A1 Sep. 25, 2025

(51) Int. Cl.
*G06F 21/56* (2013.01)
*G06F 11/1446* (2026.01)
*G06F 21/60* (2013.01)

(52) U.S. Cl.
CPC ........ *G06F 21/564* (2013.01); *G06F 11/1464* (2013.01); *G06F 21/606* (2013.01)

(58) Field of Classification Search
CPC ... G06F 21/564; G06F 11/1464; G06F 21/606
See application file for complete search history.

(56) References Cited

U.S. PATENT DOCUMENTS

| | | | | |
|---|---|---|---|---|
| 7,237,080 | B2 | 6/2007 | Green | |
| 7,784,098 | B1 | 8/2010 | Fan | |
| 8,176,558 | B2 | 5/2012 | Kuwamura | |
| 8,495,037 | B1 | 7/2013 | Westenberg | |
| 9,268,689 | B1 * | 2/2016 | Chen | G06F 21/53 |
| 9,542,555 | B2 | 1/2017 | Tuvell | |
| 9,582,382 | B1 | 2/2017 | Natanzon | |
| 9,811,662 | B2 | 11/2017 | Sharpe | |
| 10,362,057 | B1 | 7/2019 | Wu | |
| 10,476,906 | B1 | 11/2019 | Siddiqui | |
| 11,372,811 | B1 * | 6/2022 | Ciubotariu | G06F 21/565 |
| 11,640,484 | B1 * | 5/2023 | Kumar | G06F 21/6209 726/26 |
| 2003/0115483 | A1 | 6/2003 | Liang | |

(Continued)

FOREIGN PATENT DOCUMENTS

JP 2015153298 A * 8/2015

*Primary Examiner* — Trong H Nguyen
(74) *Attorney, Agent, or Firm* — David R. Stevens; Stevens Law Group

(57) ABSTRACT

A cluster includes pods, containers, application instances, and storage volumes. A cluster may be represented with a snapshot object from which the cluster can be recovered. To accelerate recovery, the snapshot object is scanned for security threats upon creation and upon receipt by a remote repository. To restore the cluster, the snapshot object is retrieved and transmitted by the remote repository without scanning. Likewise, when the snapshot object is received and used to re-instantiate the cluster without performing a security scan.

12 Claims, 5 Drawing Sheets

(56) References Cited

U.S. PATENT DOCUMENTS

| | | | | |
|---|---|---|---|---|
| 2005/0071022 | A1* | 3/2005 | Izzo | G06F 11/1438 700/79 |
| 2008/0320594 | A1 | 12/2008 | Jiang | |
| 2011/0265182 | A1* | 10/2011 | Peinado | G06F 21/566 711/E12.001 |
| 2013/0019313 | A1 | 1/2013 | Piccinini et al. | |
| 2020/0311025 | A1 | 10/2020 | Singh et al. | |
| 2020/0349008 | A1 | 11/2020 | Dawkins et al. | |
| 2022/0156384 | A1* | 5/2022 | Mandagere | G06F 21/577 |
| 2023/0342267 | A1* | 10/2023 | Pabón | G06F 11/108 |

* cited by examiner

SECURITY SCAN WITH BACKUP

BACKGROUND

Field of the Invention

This invention relates to performing a security scan with backup.

Background of the Invention

Many computing installations are extremely complex and require many components executing on many different host computing devices to operate and interoperate correctly. Tools may be used to automatically manage an installation and perform tasks such as monitoring, scaling up, scaling down, and handling failures. Some components of a computing installation are particularly critical such that constant availability should be provided. However, the complexity of a computing installation provides many opportunities for infection by malicious code or access by malicious actors.

It would be an advancement in the art to improve security of a computing installation.

SUMMARY OF THE INVENTION

An apparatus includes one or more processing devices and one or more memory devices operably coupled to the one or more processing devices, the one or more memory devices storing executable code that, when executed by the one or more processing devices, causes the one or more processing devices to create a snapshot object of a plurality of executable components executing on one or more host computing devices and one or more storage components stored in one or more storage devices coupled to the one or more host computing devices. The snapshot object is scanned for security threats and transmitted to a remote repository. In response to failure of one or more of the plurality of executable components, the snapshot object is received from the remote repository and, without again scanning the snapshot object for the security threats, the plurality of executable components and the one or more storage components are again instantiated from the snapshot object.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
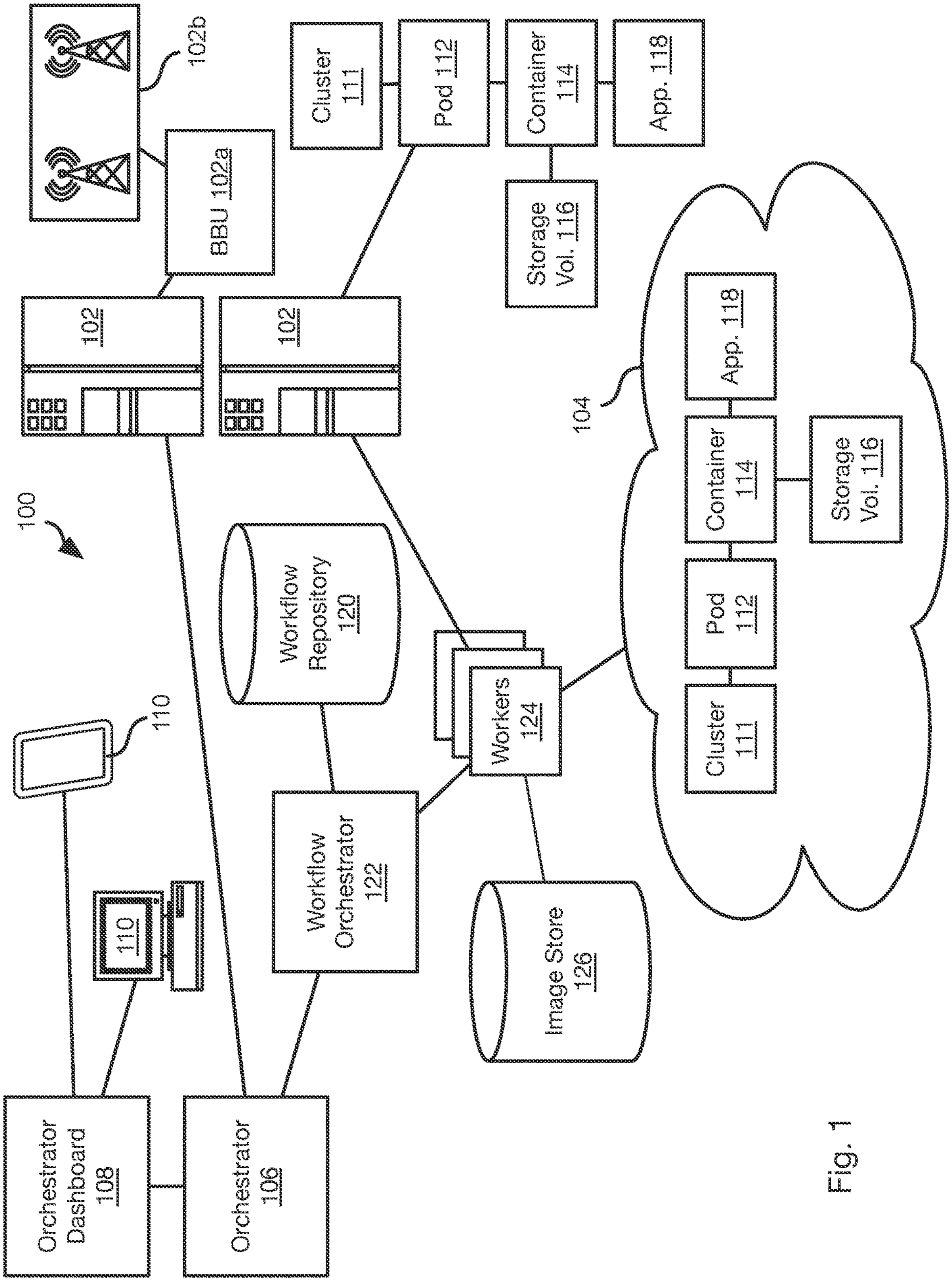
FIG. 1 is a schematic block diagram of a network environment in accordance with an embodiment.

FIG. 1 illustrates an example network environment 100 in which the systems and methods disclosed herein may be used. The components of the network environment 100 may be connected to one another by a network such as a local area network (LAN), wide area network (WAN), the Internet, a backplane of a chassis, or other type of network. The components of the network environment 100 may be connected by wired or wireless network connections. The network environment 100 includes a plurality of servers 102. Each of the servers 102 may include one or more computing devices, such as a computing device having some or all of the attributes of the computing device 500 of FIG. 5.

Computing resources may also be allocated and utilized within a cloud computing platform 104, such as amazon web services (AWS), GOOGLE CLOUD, AZURE, or other cloud computing platform. Cloud computing resources may include purchased physical storage, processor time, memory, and/or networking bandwidth in units designated by the provider by the cloud computing platform.

In some embodiments, some or all of the servers 102 may function as edge servers in a telecommunication network. For example, some or all of the servers 102 may be coupled to baseband units (BBU) 102*a* that provide translation between radio frequency signals output and received by antennas 102*b* and digital data transmitted and received by the servers 102. For example, each BBU 102*a* may perform this translation according to a cellular wireless data protocol (e.g., 4G, 5G, etc.). Servers 102 that function as edge servers may have limited computational resources or may be heavily loaded.

An orchestrator 106 provisions computing resources to application instances 118 of one or more different application executables, such as according to a manifest that defines requirements of computing resources for each application instance. The manifest may define dynamic requirements defining the scaling up or scaling down of a number of application instances 118 and corresponding computing resources in response to usage. The orchestrator 106 may include or cooperate with a utility such as KUBERNETES to perform dynamic scaling up and scaling down the number of application instances 118.

An orchestrator 106 may execute on a computer system that is distinct from the servers 102 and is connected to the servers 102 by a network that requires the use of a destination address for communication, such as using a networking including ethernet protocol, internet protocol (IP), Fibre Channel, or other protocol, including any higher-level protocols built on the previously-mentioned protocols, such as user datagram protocol (UDP), transport control protocol (TCP), or the like.

The orchestrator 106 may cooperate with the servers 102 to initialize and configure the servers 102. For example, each server 102 may cooperate with the orchestrator 106 to obtain a gateway address to use for outbound communication and a source address assigned to the server 102 for use in inbound communication. The server 102 may cooperate with the orchestrator 106 to install an operating system on the server 102. For example, the gateway address and source address may be provided and the operating system installed using the approach described in U.S. application Ser. No.

16/903,266, filed Jun. 16, 2020 and entitled AUTOMATED INITIALIZATION OF SERVERS, which is hereby incorporated herein by reference in its entirety.

The orchestrator 106 may be accessible by way of an orchestrator dashboard 108. The orchestrator dashboard 108 may be implemented as a web server or other server-side application that is accessible by way of a browser or client application executing on a user computing device 110, such as a desktop computer, laptop computer, mobile phone, tablet computer, or other computing device.

The orchestrator 106 may cooperate with the servers 102 in order to provision computing resources of the servers 102 and instantiate components of a distributed computing system on the servers 102 and/or on the cloud computing platform 104. For example, the orchestrator 106 may ingest a manifest defining the provisioning of computing resources to, and the instantiation of, components such as a cluster 111, pod 112 (e.g., KUBERNETES pod), container 114 (e.g., DOCKER container), storage volume 116, and an application instance 118. The orchestrator may then allocate computing resources and instantiate the components according to the manifest.

The manifest may define requirements such as network latency requirements, affinity requirements (same node, same chassis, same rack, same data center, same cloud region, etc.), anti-affinity requirements (different node, different chassis, different rack, different data center, different cloud region, etc.), as well as minimum provisioning requirements (number of cores, amount of memory, etc.), performance or quality of service (QoS) requirements, or other constraints. The orchestrator 106 may therefore provision computing resources in order to satisfy or approximately satisfy the requirements of the manifest.

The instantiation of components and the management of the components may be implemented by means of workflows. A workflow is a series of tasks, executables, configuration, parameters, and other computing functions that are predefined and stored in a workflow repository 120. A workflow may be defined to instantiate each type of component (cluster 111, pod 112, container 114, storage volume 116, application instance, etc.), monitor the performance of each type of component, repair each type of component, upgrade each type of component, replace each type of component, copy (snapshot, backup, etc.) and restore from a copy each type of component, and other tasks. Some or all of the tasks performed by a workflow may be implemented using KUBERNETES or other utility for performing some or all of the tasks.

The orchestrator 106 may instruct a workflow orchestrator 122 to perform a task with respect to a component. In response, the workflow orchestrator 122 retrieves the workflow from the workflow repository 120 corresponding to the task (e.g., the type of task (instantiate, monitor, upgrade, replace, copy, restore, etc.) and the type of component. The workflow orchestrator 122 then selects a worker 124 from a worker pool and instructs the worker 124 to implement the workflow with respect to a server 102 or the cloud computing platform 104. The instruction from the orchestrator 106 may specify a particular server 102, cloud region or cloud provider, or other location for performing the workflow. The worker 124, which may be a container, then implements the functions of the workflow with respect to the location instructed by the orchestrator 106. In some implementations, the worker 124 may also perform the tasks of retrieving a workflow from the workflow repository 120 as instructed by the workflow orchestrator 122. The workflow orchestrator 122 and/or the workers 124 may retrieve executable images for instantiating components from an image store 126.

Figure 2:
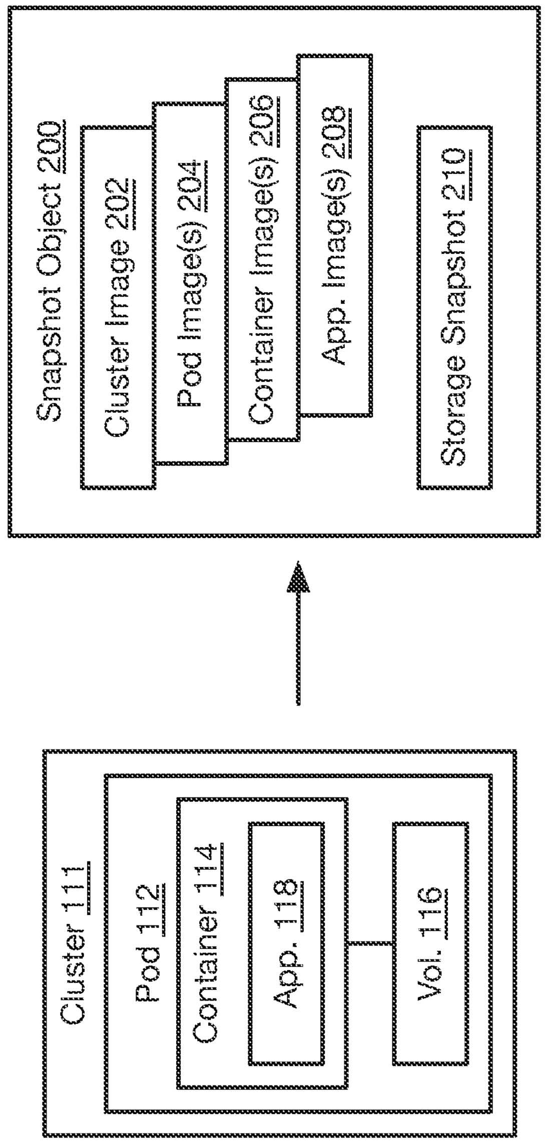
FIG. 2 is a schematic block diagram showing components for performing security scans on backup in accordance with an embodiment.

Referring to FIG. 2, a cluster 111 includes one or more pods 112 that each include one or more containers 114 hosting application instances 118. The containers 114 may further have one or more storage volumes 116 mounted thereto. It may be advantageous to create a backup of the cluster 111. The backup may be a full backup or a partial backup recording changes to the cluster since making of a prior full backup or prior partial backup.

A full or partial backup may be represented as a snapshot object 200. The snapshot object 200 may include a cluster image 202. The cluster image 202 may include an executable image of software implementing the cluster 111, such as the executable image of a KUBERNETES master. The cluster image 202 may include environmental variables, network data (e.g., data defining an internal network of the cluster 111), access points, and/or other data sufficient to configure an instance of an executable image in order to recreate the cluster 111. In some implementations, it is assumed that the executable image is available from the image store 126 and an executable image of the cluster 111 is omitted from the snapshot object 200.

The snapshot object 200 may include pod images 204 for each pod 112 of the cluster 111. The pod image 204 for each pod 112 may include an executable image of software implementing the pod 112, such as the executable image of a KUBERNETES Kubelet that acts as a logical host for one or more containers of a pod 112. The pod image 204 may include environmental variables, network data (e.g., data defining network interfaces of the pod 112), namespaces, file system data, and/or other data sufficient to configure an instance of an executable image in order to recreate the pod 112. In some implementations, it is assumed that the executable image is available from the image store 126 and an executable image of the pod 112 is omitted from the snapshot object 200.

The snapshot object 200 may include container images 206 for each container 114 of the cluster 111. The container image 206 for each container 114 may include an executable image of software implementing the container 114, such as the executable image of a DOCKER container or other type of container. The container image 206 may include environmental variables, network data (e.g., references to network interfaces of the pod 112, an address assigned to the container 114, etc.), one or more identifiers of one or more storage volumes 116 mounted to the container 114, and/or other data sufficient to configure an instance of an executable image in order to recreate the container 114. In some implementations, it is assumed that the executable image is available from the image store 126 and the executable image of the container 114 is omitted from the snapshot object 200.

The snapshot object 200 may include application images 208 for each application instance 118 of the cluster 111. The application image 208 for each application instance 118 may include an executable image used to instantiate the application instance 118. The application image 208 may include environmental variables, addresses or other data referencing other application instances 118, one or more identifiers of one or more storage volumes 116 accessed by the application instance 118, and/or other data sufficient to configure an instance of an executable image in order to recreate the application instance 118. In some implementations, it is assumed that the executable image is available from the image store 126 and the executable image of the application instance 118 is omitted from the snapshot object 200.

In some implementation, a topology of the cluster 111 may also be preserved. For example, the cluster image 202 may include identifiers of the pods 112 in the cluster 111, which may include identifiers of the pod images 204 in the snapshot object 200. A pod image 204 may include references to containers 114 belonging to the pod 112 represented by the pod image 204, which may include identifiers of container images 206 corresponding to containers 114 belonging to the pod 112. A container image 206 for a container 114 may include a reference to an application instance 118 hosted by the container 114, such as a reference to the application image 208 corresponding to the application instance 118.

A snapshot object 200 may further include a storage snapshot 210 for each storage volume 116 of the cluster. The data in the storage snapshot 210 may be in the form of blocks of data. Each block of data may represent a file, data object, segment of data (e.g., all segments having the same size) or other type of representation. Each block of data may be assigned a unique identifier that is unique to each storage volume 116 or unique to all storage volumes of the cluster 111.

Where the snapshot object 200 is a partial backup, the cluster image 202 may include only changes to any of the above-referenced items of data relative to data recorded in a previously-created snapshot object 200. Thus each part of the snapshot object 200 (cluster image 202, pod images 204, container images 206, application images 208) will record changes to the component (cluster 111, pod 112, container 114, application image 118) relative to the state of the component recorded in the previously-created snapshot object 200. For storage volumes 116, the storage snapshot 210 may include new data blocks added to a storage volume 116 that are not referenced in one or more previously-created snapshot object 200 and may indicate which data blocks of one or more previously-created snapshot objects 200 have been deleted since creation of the one or more previously-created snapshot objects. The storage snapshot 210 may further include data blocks that are modified relative to previous snapshots, which may include an indication that the data blocks are modified.

Figure 3:
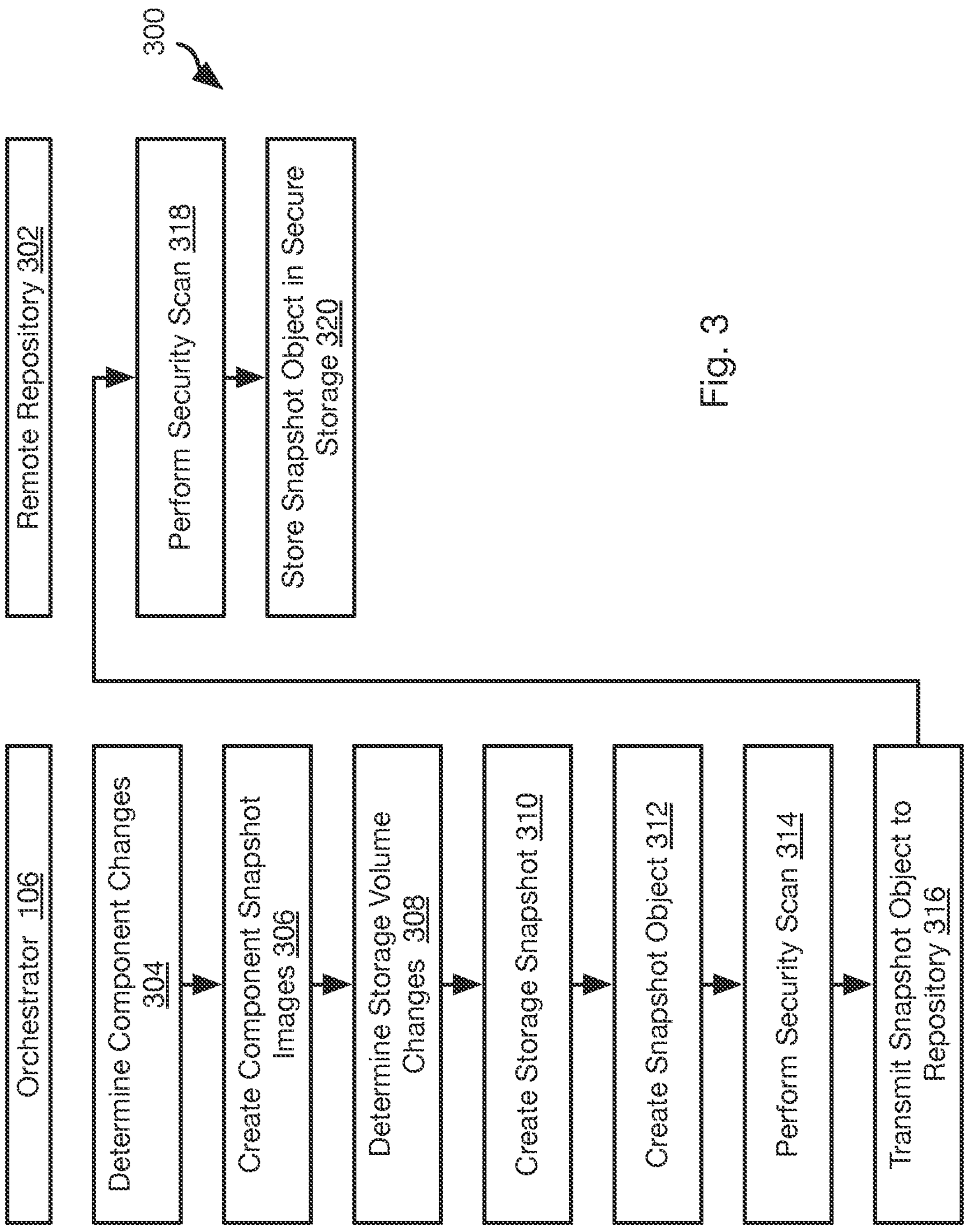
FIG. 3 is process flow diagram of a method for performing a security scan on backup in accordance with an embodiment.

FIG. 3 illustrates a method 300 for transferring a snapshot object 200 to a remote repository 302. The remote repository 302 may reside in the cloud computing platform 104, some other cloud computing platform, a server 102 that is distinct from and remote from one or more servers 102 executing the cluster 102, or some other repository. The remote repository 302 is connected to the orchestrator 106 by a network. Some or all of the portions of the method 300 described as being performed by the orchestrator 106 may be performed using a workflow from the workflow repository 120 executed by a worker 124.

The method 300 may include determining 304 changes to components of the cluster 111 since a previous snapshot object 200 was created. Where there is no previously-created snapshot object, step 304 may be omitted. Changes to components may include changes to components (pods 112, containers 114, application instances 118) or the addition or removal of components of the cluster 111. Changes to components may include changes to any of the data described above as being include in a cluster image 202, pod image 204, container image 206, and/or application image 208. Note that where the cluster image 202, pod image 204, container image 206, and/or application image 208 do not include an executable image, the amount of data required may be small such that changes to an existing component are not determined. Instead, a new cluster image 202, pod image 204, container image 206, and/or application image 208 is created for each snapshot object 200 regardless of whether a previously-created snapshot object 200 exists.

The method 300 may include creating 306 images for each component. Step 304 may include creating images 202, 204, 206, 208 for only those components that have changed since the previous snapshot object 200 was created. Step 306 may include creating images 202, 204, 206, 208 for all components (pods 112, containers 114, application instances 118) of the cluster 111 regardless of changes.

The method 300 may include determining 308 changes to one or more storage volumes 116 of the cluster 111. Changes may include addition of one or more new data blocks (files, data objects, segments of fixed size) to a storage volume, deletion of one or more data blocks, or modification of one or more data blocks. Changes may further include the creation of a new storage volume 116 or the deletion of a storage volume 116.

The method 300 may include creating 310 a storage snapshot 210 for each storage volume 116. The storage snapshot 210 volume 116 may record the changes determined at step 310. For a new storage volume, the storage snapshot 210 may include all data stored in the storage volume 116 at the time of performing the method 300.

A snapshot object 200 may then be created 312 that includes the images 202, 204, 206, 208 created at step 304 and the one or more storage snapshots 210 create at step 310 for the one or more storage volumes. Creating 312 the snapshot object 200 may include compressing the images 202, 204, 206, 208 and the one or more storage snapshots 210 either individually or as a single file. Creating 312 the snapshot object 200 may include encrypting the images 202, 204, 206, 208 and the one or more storage snapshots 210 either individually or as a single file. Creating 312 the snapshot object 200 may include digitally signing the images 202, 204, 206, 208 and the one or more storage snapshots 210 either individually or as a single file.

The method 300 may include performing 314 a security scan of the snapshot object 200. The security scan may include scanning the snapshot object 200 for viruses, malware, executable code, uniform resource locators (URL) that may refer to malicious sites, or any other potential risks. Performing 314 a security scan may be performed after the snapshot object 200 is created and may additionally or alternatively be performed on the images 202, 204, 206, 208 before or after any compression, decryption, or signing step. Likewise, the data blocks of each storage snapshot 210 be scanned before or after being included in the snapshot object 200.

The snapshot object 200 may then be transmitted 316 by the orchestrator 106 to the remote repository 302. Transmitting 316 the snapshot object 200 to the repository may include, or be preceded by, establishing a secure connection to the remote repository 302. For example, the snapshot object 200 may be encrypted using a public key for which the remote repository 302 has the corresponding private key. Any other type of secure connection may be used to connect the orchestrator 106 to the remote repository 302 in a secure manner.

Upon receiving the snapshot object 200, the remote repository 302 may also perform 318 a security scan of the snapshot object 200 and store 320 the snapshot object 200 in secure storage. The secure storage may be located behind a network firewall and include one or more other safeguards to prevent unauthorized access.

Figure 4:
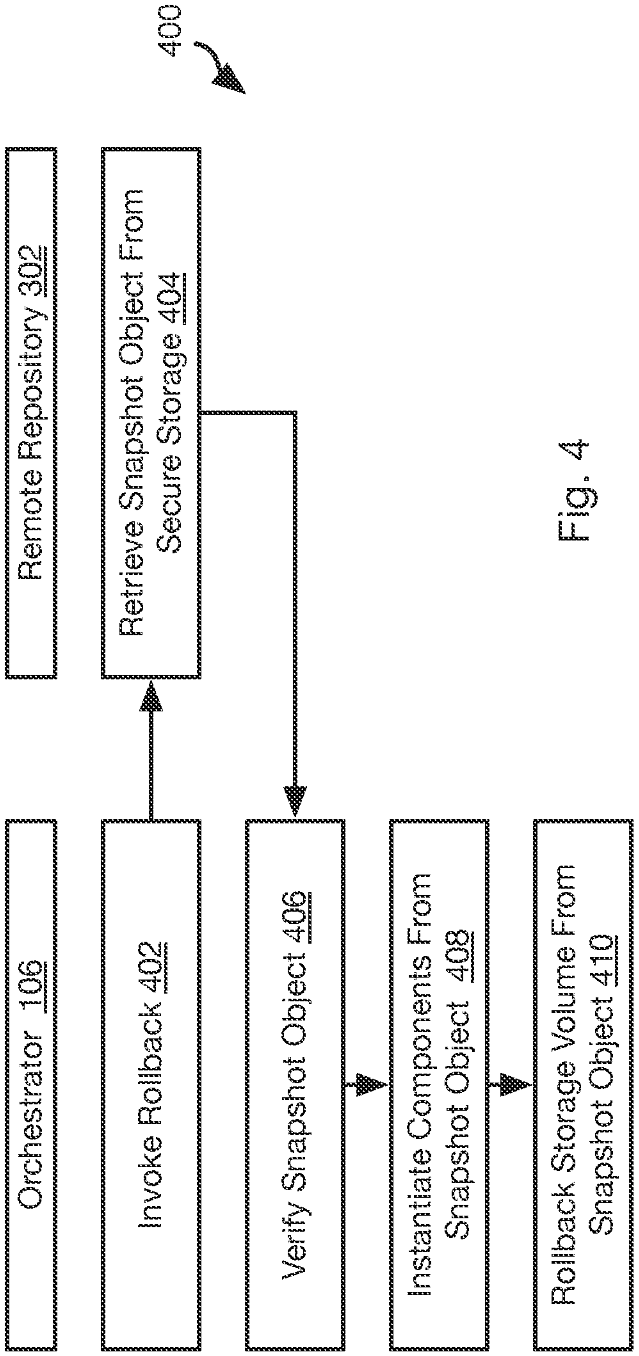
FIG. 4 is a process flow diagram of a method for restoring from a backup in accordance with an embodiment.

FIG. 4 illustrates a method 400 for restoring a cluster 111 from a snapshot object 200 that was previously transmitted to the remote repository 302 according to the method 300. The method 400 may include the orchestrator 106 invoking 402 rollback to a state of a cluster 111 stored in a snapshot object 200. The orchestrator 106 may invoke 402 rollback in order to rollback to a stable version of the cluster 111 following failure of the entire cluster 111 or one or more components of the cluster 111. The orchestrator 106 may invoke 402 rollback by transmitting a request for a snapshot object 200 to the remote repository. For example, each snapshot object 200 for a cluster 111 may have one or more identifiers, such as an identifier of the cluster 111 and an identifier of the snapshot object 200, such as a sequence number assigned to each snapshot object 200 created.

In response, the remote repository 302 retrieves 404 the snapshot object 200 identified by the orchestrator 106 and returns the snapshot object 200 to the orchestrator 106, such as over a secure connection to the orchestrator 106. Where a snapshot object 200 is a partial backup, multiple snapshots may be returned by the remote repository, such as all snapshot objects 200 for the cluster identifier with sequence numbers lower than the sequence number in the request from step 402. The orchestrator 106 may request only those snapshots objects 200 for data that is absent from the hosts of a cluster 111 such that only the requests snapshot objects 200 are returned by the remote repository 302 to the orchestrator 106.

Upon receiving a snapshot object 200, the orchestrator 106 may verify 406 the snapshot object 200. Verification may include verifying that the snapshot object 200 matches a signature of the snapshot object 200. Verification 406 may be performed for each snapshot object 200 received.

Note that verification at step 406 does not include performing a security scan. When a cluster fails and needs to be brought back up, the delay caused by performing a security scan would cause the disruption from the failure to last much longer. The method 300 therefore may be performed instead such that the snapshot object 200 may be used immediately as soon as the snapshot object 200 is received from the remote repository 302.

The orchestrator 106 may instantiate 408 components (cluster 111, pods 112, containers 114, and application instances) referenced in the snapshot object 200 from the cluster image 202, pod images 204, container images 206, and application images 208. Where the snapshot object 200 does not include executable images for the components, the executable images may be requested from and received from the image store 126. Where there are multiple snapshot objects 200, the snapshot objects 200 may be processed according to step 408 in order, e.g., in order of increasing sequence numbers.

Instantiating 408 components may include or be followed by configuring the components with data included in the images 202, 204, 206, 208. The components may further be configured to interoperate with one another using topology data included in the images 202, 204, 206, 208

The method 400 may further include rolling back 410 storage volumes 116 of the cluster 111 according to the snapshot object 200. Rolling back 410 may include populating each storage volume 116 with all blocks of data in the snapshot object 200. Where a storage volume 116 referenced by the snapshot object 200 no longer exists, a storage volume 116 may be created and assigned an identifier of the storage volume recorded in the snapshot object 200. Where multiple snapshot objects 200 exist, the snapshot objects 200 may be processed in order, e.g., in order of increasing sequence numbers, in order to obtain all data blocks in the latest snapshot of each storage volume.

Figure 5:
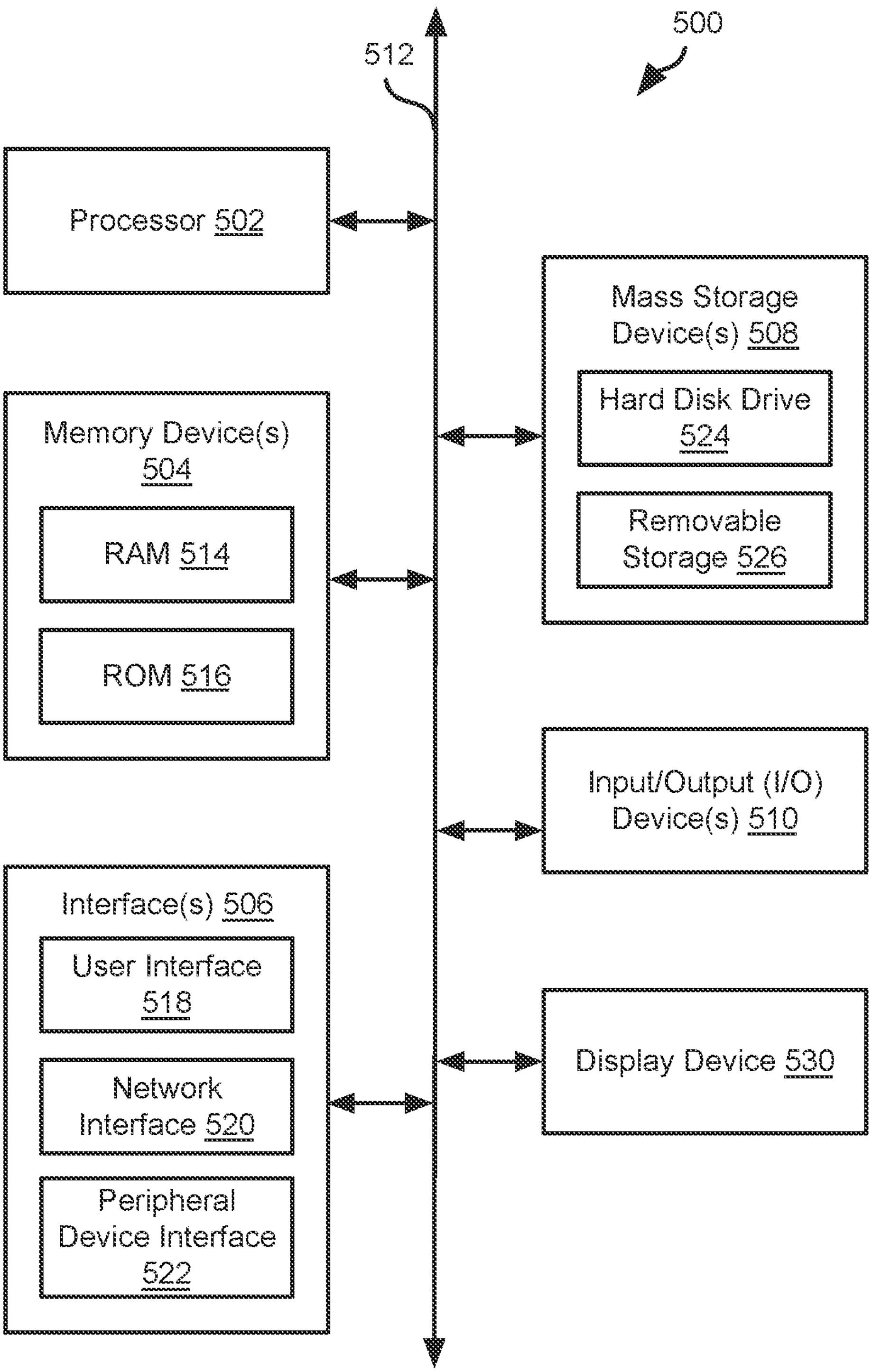
FIG. 5 is a schematic block diagram of an example computing device suitable for implementing methods in accordance with embodiments of the invention.

FIG. 5 is a block diagram illustrating an example computing device 500. Computing device 500 may be used to perform various procedures, such as those discussed herein. The servers 102, orchestrator 106, workflow orchestrator 122, and cloud computing platform 104 may each be implemented using one or more computing devices 500. The orchestrator 106 and workflow orchestrator 122 may be implemented on different computing devices 500 or a single computing device 500 may execute both of the orchestrator 106 and workflow orchestrator 122.

Computing device 500 includes one or more processor(s) 502, one or more memory device(s) 504, one or more interface(s) 506, one or more mass storage device(s) 508, one or more Input/output (I/O) device(s) 510, and a display device 530 all of which are coupled to a bus 512. Processor(s) 502 include one or more processors or controllers that execute instructions stored in memory device(s) 504 and/or mass storage device(s) 508. Processor(s) 502 may also include various types of computer-readable media, such as cache memory.

Memory device(s) 504 include various computer-readable media, such as volatile memory (e.g., random access memory (RAM) 514) and/or nonvolatile memory (e.g., read-only memory (ROM) 516). Memory device(s) 504 may also include rewritable ROM, such as Flash memory.

Mass storage device(s) 508 include various computer readable media, such as magnetic tapes, magnetic disks, optical disks, solid-state memory (e.g., Flash memory), and so forth. As shown in FIG. 5, a particular mass storage device is a hard disk drive 524. Various drives may also be included in mass storage device(s) 508 to enable reading from and/or writing to the various computer readable media. Mass storage device(s) 508 include removable media 526 and/or non-removable media.

I/O device(s) 510 include various devices that allow data and/or other information to be input to or retrieved from computing device 500. Example I/O device(s) 510 include cursor control devices, keyboards, keypads, microphones, monitors or other display devices, speakers, printers, network interface cards, modems, lenses, CCDs or other image capture devices, and the like.

Display device 530 includes any type of device capable of displaying information to one or more users of computing device 500. Examples of display device 530 include a monitor, display terminal, video projection device, and the like.

Interface(s) 506 include various interfaces that allow computing device 500 to interact with other systems, devices, or computing environments. Example interface(s) 506 include any number of different network interfaces 520, such as interfaces to local area networks (LANs), wide area networks (WANs), wireless networks, and the Internet. Other interface(s) include user interface 518 and peripheral device interface 522. The interface(s) 506 may also include one or more peripheral interfaces such as interfaces for printers, pointing devices (mice, track pad, etc.), keyboards, and the like.

Bus 512 allows processor(s) 502, memory device(s) 504, interface(s) 506, mass storage device(s) 508, I/O device(s) 510, and display device 530 to communicate with one another, as well as other devices or components coupled to bus 512. Bus 512 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 500, and are executed by processor(s) 502. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to “one embodiment,” “an embodiment,” “an example embodiment,” etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives (“SSDs”) (e.g., based on RAM), Flash memory, phase-change memory (“PCM”), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A “network” is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The invention claimed is:

1. An apparatus comprising:

one or more processing devices and one or more memory devices operably coupled to the one or more processing devices, the one or more memory devices storing executable code that, when executed by the one or more processing devices, causes the one or more processing devices to:

create a snapshot object of a plurality of executable components executing on one or more host computing devices and one or more storage components stored in one or more storage devices coupled to the one or more host computing devices, the plurality of executable components including a cluster, one or more pods included in the cluster, one or more containers included in the one or more pods, and one or more application instances hosted in the one or more containers, the snapshot object including an executable image of software implementing the cluster, environmental variables of the cluster, network data defining an internal network of the cluster, and access points of the cluster;

scan the snapshot object for security threats;

after scanning the snapshot object for security threats, transmit the snapshot object to a remote repository; and in response to failure of one or more of the plurality of executable components:

receive the snapshot object from the remote repository;

verify that the snapshot object as received from the remote repository matches a signature of the snapshot object; and upon the verification, without again scanning the snapshot object for the security threats, instantiate the plurality of executable components and the one or more storage components using the snapshot object; and the remote repository, the remote repository configured to again scan the snapshot object for the security threats upon receipt and store the snapshot object in storage of the remote repository.

2. The apparatus of claim 1, wherein the remote repository is configured to retrieve the snapshot object from the storage and transmit the snapshot object without again scanning the snapshot object for the security threats.

3. The apparatus of claim 1 wherein the cluster is a KUBERNETES cluster.

4. The apparatus of claim 1, wherein the snapshot object is a second snapshot object recording changes to the plurality of executable components and the one or more storage components subsequent to creation of a first snapshot object.

5. The apparatus of claim 1, wherein the security threats include computer viruses.

6. The apparatus of claim 1, wherein the executable code, when executed by the one or more processing devices, further causes the one or more processing devices to:

transmit the snapshot object to the remote repository over a secure connection.

7. A method comprising:

creating, by a computing device, a snapshot object of a plurality of executable components executing on one or more host computing devices and one or more storage components stored in one or more storage devices coupled to the one or more host computing devices, the plurality of executable components including a cluster, one or more pods included in the cluster, one or more containers included in the one or more pods, and one or more application instances hosted in the one or more containers, the snapshot object including an executable image of software implementing the cluster, environmental variables of the cluster, network data defining an internal network of the cluster, and access points of the cluster;

scanning, by the computing device, the snapshot object for security threats;

after scanning the snapshot object for security threats, transmitting, by the computing device, the snapshot object to a remote repository;

(a) again scanning, by the remote repository, the snapshot object for the security threats upon receipt from the computing device;

after (a) storing, by the remote repository, the snapshot object in storage of the remote repository; and in response to failure of one or more of the plurality of executable components:

receiving, by the computing device, the snapshot object from the remote repository;

verifying that the snapshot object as received from the remote repository matches a signature of the snapshot object; and upon the verification, without again scanning the snapshot object for the security threats, instantiating, by the computing device, the plurality of executable components and the one or more storage components using the snapshot object.

8. The method of claim 7, further comprising:

retrieving, by the remote repository, the snapshot object from the storage; and transmitting, by the remote repository, the snapshot object to the computing device without again scanning the snapshot object for the security threats.

9. The method of claim 7, wherein the cluster is a KUBERNETES cluster.

10. The method of claim 7, wherein the snapshot object is a second snapshot object recording changes to the plurality of executable components and the one or more storage components subsequent to creation of a first snapshot object.

11. The method of claim 7, wherein the security threats include computer viruses.

12. The method of claim 7, wherein transmitting the snapshot object to the remote repository comprises transmitting the snapshot object over a secure connection.

* * * * *